United States Patent
Åhlander et al.

(10) Patent No.: US 9,877,336 B2
(45) Date of Patent: Jan. 23, 2018

(54) METHODS AND SYSTEMS FOR LINK ADAPTATION

(71) Applicant: Telefonaktiebolaget L M Ericsson (publ), Stockholm (SE)

(72) Inventors: Mats Åhlander, Täby (SE); Mikael Jonsson, Vällingby (SE); Stéphane Tessier, Stockholm (SE); Jianwei Zhang, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/654,615

(22) PCT Filed: Jun. 9, 2015

(86) PCT No.: PCT/SE2015/050664
§ 371 (c)(1),
(2) Date: Jun. 22, 2015

(87) PCT Pub. No.: WO2016/200296
PCT Pub. Date: Dec. 15, 2016

(65) Prior Publication Data
US 2016/0366696 A1    Dec. 15, 2016

(51) Int. Cl.
*H04W 72/12* (2009.01)
*H04B 7/06* (2006.01)
(Continued)

(52) U.S. Cl.
CPC ...... *H04W 72/1231* (2013.01); *H04B 7/0626* (2013.01); *H04B 7/0632* (2013.01);
(Continued)

(58) Field of Classification Search
CPC .......... H04W 52/146; H04W 72/0413; H04W 72/042; H04W 72/0446; H04L 5/0007; H04L 5/0053; H04L 1/0026; H04L 1/04
(Continued)

(56) References Cited

U.S. PATENT DOCUMENTS

2007/0155338 A1* 7/2007 Hong ..................... H04B 7/026
455/69
2011/0280177 A1* 11/2011 Horiuchi ............... H04L 27/261
370/315
(Continued)

OTHER PUBLICATIONS

Huawei et al, "Remaining details on CSI RS", 3GPP Draft, R1-105840, 3rd Generation Partnership Project (3GPP), Mobile Competence Centre, 650, Route Des Lucioles; F-06921 Sophia-Antipolis Cedex, France, vol. RAN WG1, No. Jecksonville,USA, Nov. 10, 2010, 12 pages, XP050489749.
(Continued)

*Primary Examiner* — Jamal Javaid
(74) *Attorney, Agent, or Firm* — Rothwell, Figg, Ernst & Manbeck, P.C.

(57) ABSTRACT

A base station that implements an improved link adaptation process that takes into account the fact that a certain reference signal (e.g., CSI-RS) may be seen as interference by certain wireless communication devices (WCDs). Accordingly, when the base station schedules a data transmission for the WCD to occur in a particular TTI and the base station is scheduled to transmit the CSI-RS during the same TTI, the base station will tend to select a more robust MCS for the data transmission to the WCD to counter effect the possible interference caused by the CSI-RS.

20 Claims, 6 Drawing Sheets

(51) Int. Cl.
- *H04J 11/00* (2006.01)
- *H04L 1/00* (2006.01)
- *H04L 1/20* (2006.01)
- *H04B 17/373* (2015.01)
- *H04B 17/336* (2015.01)
- *H04B 17/382* (2015.01)

(52) U.S. Cl.
CPC ......... *H04B 7/0639* (2013.01); *H04B 17/373* (2015.01); *H04J 11/0023* (2013.01); *H04L 1/0015* (2013.01); *H04L 1/0026* (2013.01); *H04L 1/20* (2013.01); *H04W 72/1273* (2013.01); *H04B 17/336* (2015.01); *H04B 17/382* (2015.01)

(58) Field of Classification Search
USPC .................................. 370/329, 328, 252
See application file for complete search history.

(56) References Cited

U.S. PATENT DOCUMENTS

| | | | |
|---|---|---|---|
| 2013/0194940 A1 | 8/2013 | Li et al. | |
| 2013/0301432 A1* | 11/2013 | Hammarwall | H04W 24/02 370/252 |

OTHER PUBLICATIONS

Renesas Mobile Europe Ltd, "On CQI definition", 3GPP Draft, R1-125051, 3rd Generation Partnership Project (3GPP), Mobile Competence Centre, 650, Route Des Lucioles, F-06921 Sophia-Antipolis Cedex, France, vol. RAN WG1, No. New Orleans, USA, Nov. 12, 2012-Nov. 16, 2012, Nov. 2, 2012, 4 pages, XP050662709.

* cited by examiner

METHODS AND SYSTEMS FOR LINK ADAPTATION

CROSS-REFERENCE TO RELATED APPLICATIONS

This application is a 35 U.S.C. § 371 National Phase Entry Application from PCT/SE2015/050664, filed Jun. 9, 2015, and designating the United States.

TECHNICAL FIELD

Aspects of this disclosure relate methods and system for link adaptation in a wireless communication network.

BACKGROUND

Long Term Evolution (LTE) is a wireless communication network technology standardized by the 3rd Generation Partnership Project (3GPP). LTE communication networks support a packet-switched domain rather than a circuit-switched domain as in previous 3GPP systems. Thus, data may be moved in a LTE network using separate small blocks of data (e.g., packets). The LTE standard is based on orthogonal frequency-division multiplexing (OFDM) in the downlink, and single carrier frequency division multiple access (SC-FDMA) in the uplink. In the time domain in the downlink, one subframe is divided into a number of OFDM symbols. Thus, one OFDM symbol may consist of a number of sub-carriers in the frequency domain.

In LTE, no dedicated channels are used for the transmission of user data. Instead, shared channel resources are used in both the downlink and uplink. Shared resources are controlled by a scheduler that assigns different parts of the downlink and uplink shared channels to different wireless communication devices (WCDs) (e.g., smartphones, tablets, phablets, personal computers, etc.) for reception and transmission, respectively.

Release 8 of the 3GPP standard introduced cell-specific reference signals (CRS) in the downlink designed for use in channel estimation for up to 4-layer spatial multiplexing, with separate CRS sequences for each antenna port. However, with the addition of up to 8-layer spatial multiplexing in Release 10 of the 3GPP standard came the need for 8-layer channel estimation.

Because extending CRS to 8 layers would add more signaling overhead than otherwise desired, Release 10 introduces the Channel State Information Reference Signal (CSI-RS). CSI-RS is transmitted from a base station on different antenna ports than CRS such that CRS measurements are not interfered by CSI-RS transmissions. Additionally, instead of using only time/frequency orthogonally as in CRS, CSI-RS further uses code-domain orthogonality. CSI-RS may be regularly transmitted by a base station and may be used for measurement purposes and estimating channel state quality by WCDs compliant with Release 10.

Link Adaptation (LA) is an important function in a wireless communication network. In LTE, the purpose of LA is to select a modulation and coding scheme (MCS) to use when transmitting data (e.g., a transport block) to a WCD. Typically, an MCS is selected for each transport block, which is transmitted every transmission time interval (TTI).

A conventional LA process selects an appropriate MCS based on a channel quality value (e.g., a Signal to Interference plus Noise Ratio (SINR) estimate) and an offset value (offset) (this offset value is sometimes referred to as the "outer-loop" offset value). For example, a conventional LA process calculates an adjusted SINR (SINRa) based on the estimated SINR (SINRe) and the outer-loop offset value (e.g., SINRa=SINRe+offset) and then uses SINRa to pick an MCS (e.g., an MCS index) from a set of available MCSs. For example, once the adjusted SINR (SINRa) is calculated, the base station can use a look-up table to select the MCS that corresponds to SINRa.

The channel quality value (e.g., SINR) may be determined based on channel state information (CSI) reported to the base station by the WCD for which the MCS is being selected. The outer-loop offset value is dependent on a Hybrid Automatic Repeat Request (HARQ) message (i.e., HARQ ACK or HARQ NACK) transmitted by the WCD and received by the base station. A conventional LA process calculates the offset as follows: offset=offset+ACKoffset or offset=offset+NACKoffset, depending on whether a HARQ ACK or HARQ NACK was received, respectively.

SUMMARY

Certain WCDs (e.g., Release 8/9 WCDs) are not aware of CSI-RS transmissions. Such WCDs are referred to as "legacy" WCDs. Legacy WCDs may interpret CSI-RS transmissions as interference in certain physical downlink shared channel (PDSCH) resource elements. A legacy WCD may also try to interpret the CSI-RS symbols as its own data, and in situations where a high modulation and coding scheme (MCS) selection rate is used (e.g., very little redundancy in coding), the cyclic redundancy check (CRC) may consistently fail.

If no measures are taken to protect the performance of legacy WCDs when scheduled in CSI-RS subframes, then the performance of such legacy WCDs may be severely affected. For example, LA for a legacy WCD may be applied with input from CRS measurements that are not affected by CSI-RS transmissions, resulting in a too optimistic MCS selection. Then, when the PDSCH transmission including data for a WCD is scheduled in a CSI-RS subframe, the robustness of the radio channel will be insufficient and result in a high block error rate (BLER). To correct the BLER to a desired level, an outer loop offset may shift MCS selection towards increase robustness. However, this may result in a legacy WCD being scheduled using an MCS selection that is too low for most of the transmissions (e.g., in all non-CSI-RS subframes), thereby resulting in reduced channel throughput.

Accordingly, there exists a need to address the performance of legacy WCDs when scheduled in CSI-RS subframes while maintaining maximum channel throughput. The present disclosure proposes a solution where, for legacy WCDs, the MCS selection procedure takes into account whether a CSI-RS transmission is set to occur in the same TTI as a data transmission for the WCD. In this way, a more robust MCS can be selected when a transmission of data to the WCD and a transmission of the CSI-RS are set to occur at the same time. For example, in some embodiments, the outer-loop offset value is dependent not only on a HARQ acknowledgement message, but also dependent on whether the transport block for which the MCS is being selected is scheduled to be transmitted in a TTI during which the CSI-RS is also scheduled to be transmitted. Thus, a robust MCS may be selected for CSI-RS subframes without affecting LA behavior in the rest of the subframes.

In one aspect, therefore, there is provided a method performed by a base station. The method includes the base station scheduling a first data transmission for a wireless communication device (WCD), where the scheduled first data transmission to occur during a first transmission time interval (TTI). The base station also determines whether to a) select a first modulation and coding scheme, MCS, for the first data transmission using a first offset value or b) select the MCS for the data transmission using a second offset value that is different than the first offset value. This determination of whether to use the first or second offset value is based on whether a certain reference signal (RS) (e.g., the CSI-RS) is also scheduled to be transmitted during the first transmission time interval. The base station selects a first MCS using the first offset value as a result of determining that the certain RS is also scheduled to be transmitted during the first transmission time interval. The base station then, during the first transmission time interval, uses the selected first MCS to transmit data to the WCD. In this way, a robust MCS may be selected.

In some embodiments, selecting the first MCS using the first offset value comprises determining a first channel quality value offset (CQV_offset1) using the first offset value. In such embodiments, selecting the first MCS using the first offset value further comprises: determining a channel quality value (CQV) representing the quality of the channel between the base station and the WCD; and calculating an adjusted CQV (CQVa) using the determined CQV and CQV_offset1. In some embodiments CQVa=CQV+CQV_offset1. In some embodiments, selecting the first MCS using the first offset value further comprises selecting the MCS based on the adjusted channel quality value CQVa.

In some embodiments, determining CQV_offset1 comprises: calculating CQV_offset_old+offset1, wherein CQV_offset_old is a previously determined CQV offset value and offset1 is the first offset value. Offset1 may equal one of a CSI-RS_ACK_offset and a CSI-RS_NACK_offset, wherein each of the CSI-RS_ACK_offset and the CSI-RS_NACK_offset is a predetermined offset value.

In some embodiments, CQV_offset1 equals CSI-RS_offset, wherein CSI-RS_offset is the first offset value.

In some embodiments, the method further includes: scheduling a second data transmission for the WCD (110), the scheduled second data transmission to occur during a second transmission time interval; determining whether to a) select a second modulation and coding scheme, MCS, for the second data transmission using the first offset value or b) select the MCS for the data transmission using the second offset value that is different than the first offset value, wherein the determination of whether to use the first or second offset value for the second data transmission is based on whether a certain reference signal (RS) is also scheduled to be transmitted during the second transmission time interval; selecting a second MCS using the second offset value as a result of determining that the certain RS not scheduled to be transmitted during the second transmission time interval; and during the second transmission time interval, using the selected second MCS to transmit data to the WCD. In such embodiments, selecting the second MCS using the second offset value may include determining a second channel quality value offset (CQV_offset2) using the second offset value, and determining CQV_offset2 comprises: calculating CQV_offset_old+offset2, wherein CQV_offset_old is a previously determined CQV offset value and offset2 is the second offset value. In some embodiments, offset2 equals one of NON-CSI-RS_ACK_offset and NON-CSI-RS_NACK_offset, each of NON-CSI-RS_ACK_offset and NON-CSI-RS_NACK_offset is a predetermined offset value, CSI-RS_ACK_offset<NON-CSI-RS_ACK_offset, and CSI-RS_NACK_offset<NON-CSI-RS_NACK_offset.

The above and other aspects and embodiments are described below with reference to the accompanying drawings.

BRIEF DESCRIPTION OF DRAWINGS

The accompanying drawings, which are incorporated herein and form part of the specification, illustrate various embodiments.

DETAILED DESCRIPTION

The present disclosure provides an improvement to the LA procedure for legacy WCDs (e.g., WCDs for which CSI-RS is interpreted as interference). The LA procedures disclosed herein provide several benefits over prior art solutions, including, for example: legacy WCDs may be scheduled in CSI-RS subframes, legacy WCD performance may be optimized in cells where CSI-RS are sent, and there may be an improved performance on the cell and network level due to the effective handling of legacy WCDs in CSI-RS subframes.

As described above, scheduling data transmissions to legacy WCDs in CSI-RS subframes without any special procedures, such as those described herein, may result in severely degraded performance (e.g., high BLER) and reduced channel throughput. While one solution may be to not schedule any legacy WCDs in CSI-RS subframes, this solution suffers from poor performance. For example, a 10 ms periodicity of CSI-RS may result in 10% loss in peak rate.

The LA procedures described herein optimizes the handling of legacy WCDs by determining whether a data transmission to the WCD and a CSI-RS is scheduled for the same time interval, and selecting a modulation and coding scheme (MCS) based on the determinations. For example, using a first or second offset parameter based on the determination of whether the CSI-RS is scheduled to occur in the time interval as a transmission to the legacy WCD.

Figure 1:
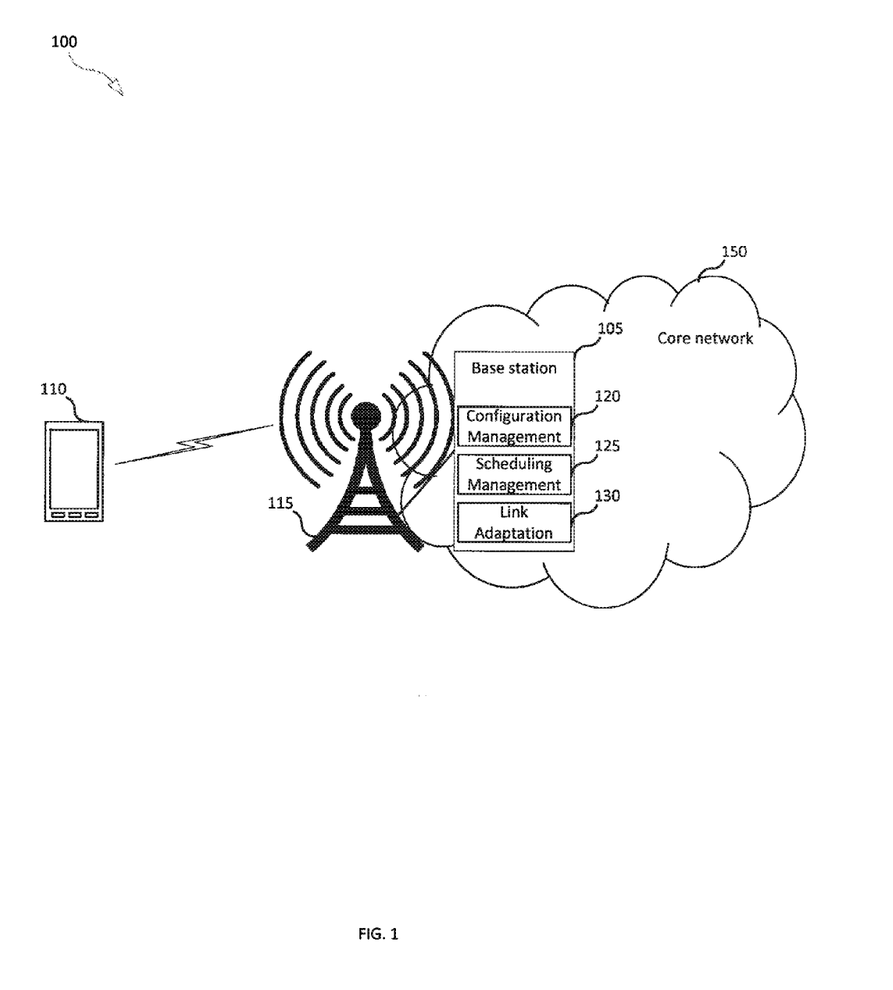
FIG. 1 is a block diagram of a communication network, according to some embodiments.

Referring now to FIG. 1, FIG. 1 is a block diagram of a communication network 100 according to some embodiments. As shown in FIG. 1, communication network 100 includes a base station 105 (e.g., an evolved NodeB (eNB)), which is connected to a core network 150. The base station 105 may be in communication with a WCD 110 such that data may be transmitted between WCD 110 and base station 105 via an antenna system 115. The base station 105 may comprise the following functional components: a configuration manager 120, a scheduler 125, and link adaptation module 130.

The configuration manager 120 may be responsible for managing (e.g., storing) configuration information used by base station 105. In some embodiments, the configuration information may indicate whether a certain cell is configured with certain reference signals (e.g., CSI-RS) and the periodicity with which the reference signals are transmitted. The scheduler 125 is responsible for, among other things, scheduling resources for the uplink and downlink channels to/from one or more WCDs 110. The scheduler 125 component may dynamically allocate resources based on, for example, the signal to interference noise ratio (SINR) of a specific channel, traffic volume, and quality of service (QoS) requirements. The link adaptation module 130 component is responsible for selecting an MCS, as described below.

Figure 2:
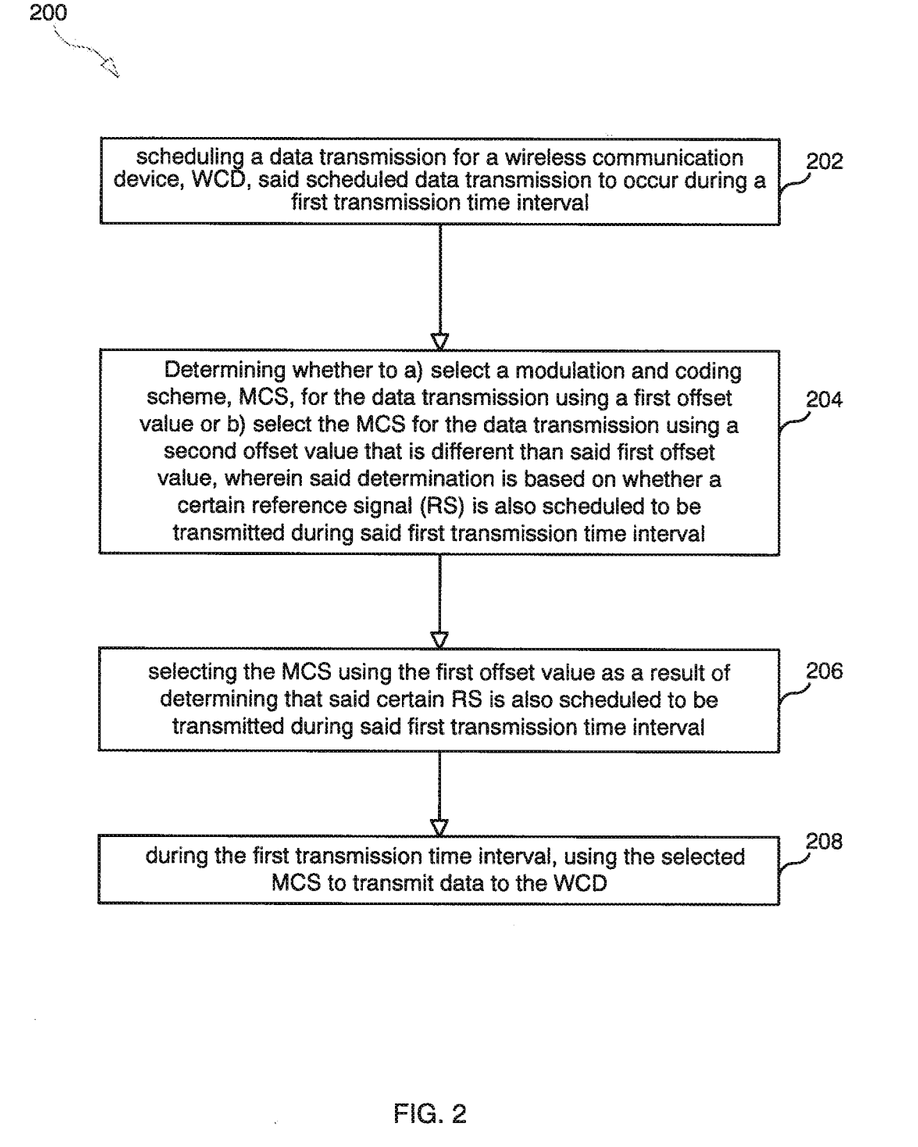
FIG. 2 is a flow chart illustrating a process according to some embodiments.

FIG. 2 is a flow chart illustrating a process 200, according to some embodiments, for a link adaptation procedure for a WCD 110. In preferred embodiments, process 200 may be performed by a base station 105 (e.g., by link adaptation module 130 of base station 105).

In step 202, the base station 105, using scheduler 125, schedules a data transmission for a WCD 110, the data transmission to occur during a particular TTI. In this example, WCD 110 is a legacy WCD.

In step 204, because the WCD 110 is a legacy WCD, the base station 105 determines whether to a) select the MCS for the data transmission using a first offset value or b) select the MCS for the data transmission using a second offset value. The determination of whether to use the first or second offset value is based on (e.g., based at least in part on) whether a certain reference signal (e.g., CSI-RS) is also scheduled to be transmitted during the same TTI.

For example, the base station 105 may be configured to select the MCS using the first offset value when it is determined that the CSI-RS is to be transmitted in the same TTI as the transmission to the WCD 110, otherwise base station 105 selects the MCS using the second offset value. In such a scenario, using the first offset value in the MCS selection process will, in most cases, lead to the selection of a more robust MCS than the MCS selected as a result of using the second offset value in the MCS selection process. Hence, the base station 105 can optimize the handling of legacy WCDs in cells that utilize the CSI-RS.

In step 206, the base station 105 selects the MCS using the first offset value as a result of determining that the CSI-RS is also scheduled to be transmitted during the particular TTI. As discussed above, the first offset value may correspond to a more robust MCS.

In step 208, the base station 105, during the particular TTI, uses the selected MCS to transmit the data to the WCD 110. In preferred embodiments, the selected MCS maintains a desirable BLER.

Figure 3:
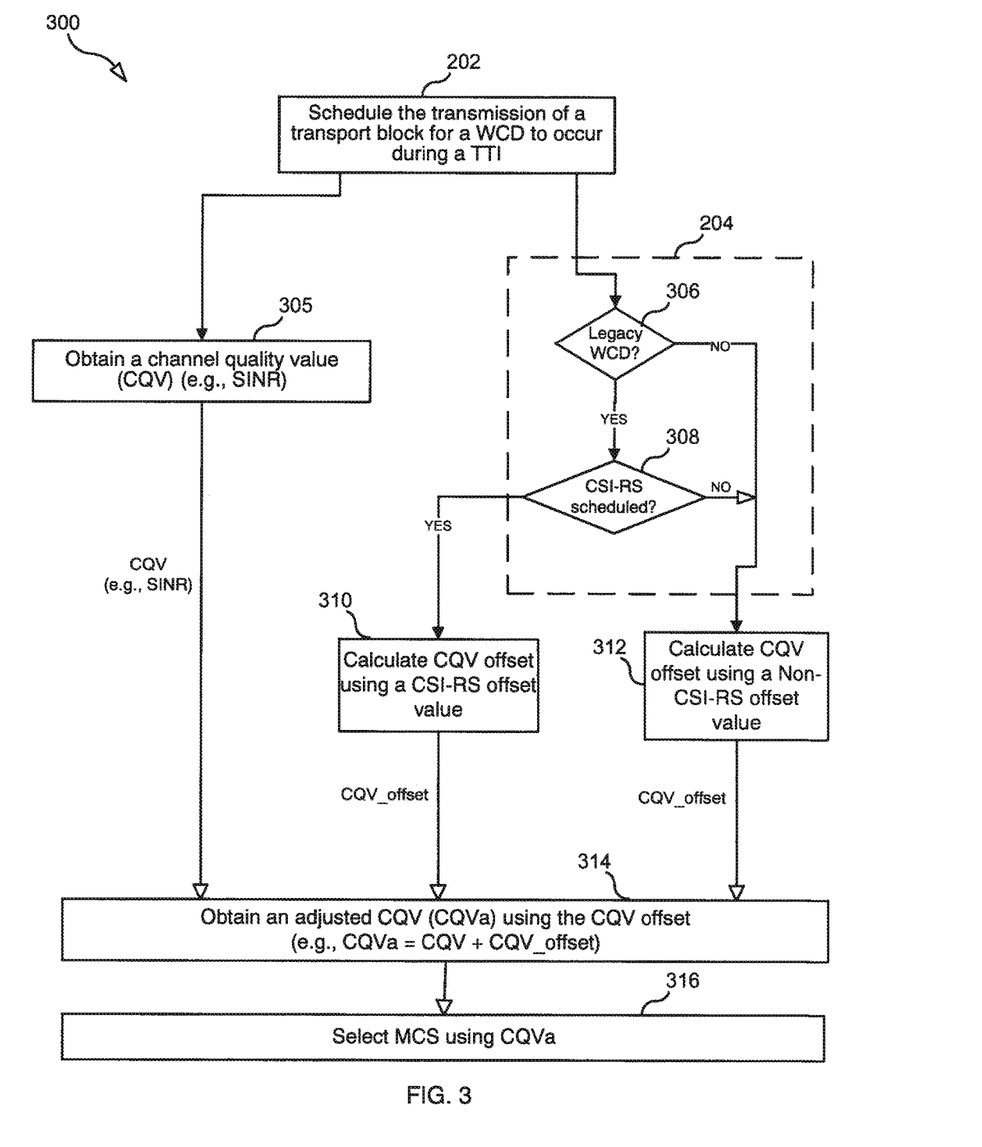
FIG. 3 is a flow chart illustrating a process according to some embodiments.

FIG. 3 is a flow chart illustrating a process 300, according to some embodiments, for implementing process 200.

Process 300 may begin with step 202, in which base station 105 schedules a data transmission for WCD 110, the data transmission to occur during a particular TTI.

In step 305, base station obtains a channel quality value (CQV). The CQV, in a preferred embodiments, is a SINR estimate. The SINR estimate may be determined based on channel state information that WCD 110 provides to base station 105. WCD 110 may obtain the channel state information by determining the status of the channel between the base station and the WCD using a reference signal transmitted by the base station. In step 314, base station adjusts the CQV obtained in step 305 using the CQV obtained in step 305 and using a CQV_offset value. As shown in steps 306-312, the CQV_offset that is used in step 314 depends on whether the CSI-RS is scheduled to be transmitted in the same TTI (assuming the WCD 100 is a legacy WCD). As further described herein, the CQV_offset may also depend on other factors, such as whether the last HARQ acknowledgement message from the WCD was an ACK or a NACK.

In step 306, base station 105 determines whether WCD 110 is a legacy WCD. Base station 105 may determine this based on configuration information that WCD 110 provided when it first attached to the network. If WCD 110 is not a legacy WCD, then step 312 will be performed. In step 308, base station 105 determines whether the CSI-RS is set to be transmitted in the same particular TTI. If it is not set to be transmitted in the same TTI, then step 312 will be performed, otherwise step 310 is performed.

In step 314, base station 105 obtains an adjusted CQV (CQVa) using the CQV obtained in step 305 and using the CQV_offset calculated in step 310 or 312. For example, base station calculates: CQVa=CQV+CQV_offset.

In step 316, base station 105 selects the MCS for the data transmission for the WCD using CQVa. For example, base station 105 may have a look-up table or other data structure that maps CQVa values to MCS indexes. The base station 105 then uses the MCS to transmit data to the WCD.

Figure 4A:
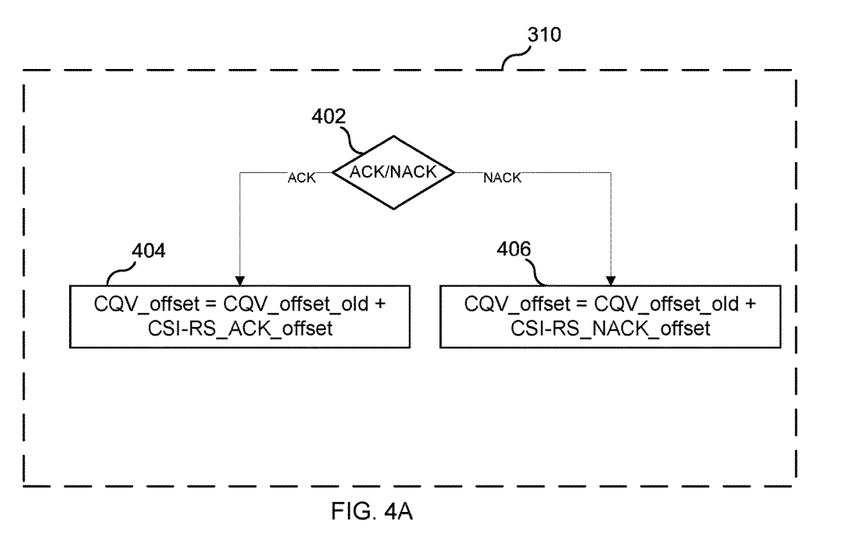
FIG. 4A is a flow chart illustrating a process according to some embodiments.
Figure 4B:
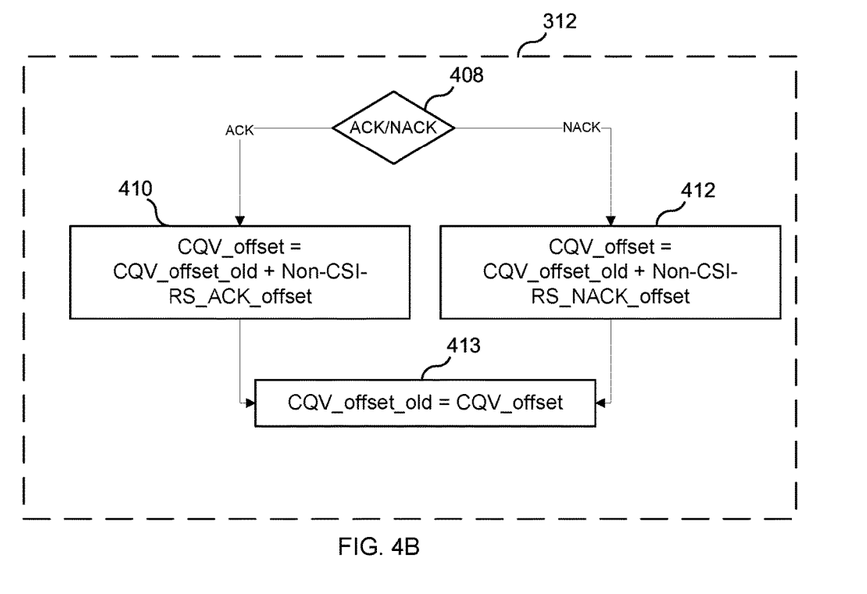
FIG. 4B is a flow chart illustrating a process according to some embodiments.

FIGS. 4A and 4B illustrate an example way in which steps 310 and 312 may be implemented, respectively.

As show in FIG. 4A, step 310 may start with step 402, in which base station 105 determines whether a HARQ acknowledgement (ack) message transmitted by WCD 101 was an ACK or a NACK (e.g., the most recent HARQ ack message or the most recent HARQ ack message transmitted in response to a transport block transmitted to the WCD during a CSI-RS subframe). If it was an ACK, then step 404 is performed, and if it was a NACK, then step 406 is performed.

In step 404, base station 105 calculates CQV_offset using a CSI-RS_ACK_offset value. Specifically, in some embodiments, base station 105 calculates: CQV_offset=CQV_offset_old+CSI-RS_ACK_offset, where CQV_offset_old is a previously determined CQV offset value (e.g., a previously determined CQV_offset value uniquely associated with the WCD). In some embodiments, CQV_offset_old=0 such that CQV_offset=CSI-RS_ACK_offset In step 406, base station 105 calculates CQV_offset using a CSI-RS_NACK_offset_value, which may be the same as or different than CSI-RS_ACK_offset value. Specifically, base station 105 calculates: CQV_offset=CQV_offset_old+CSI-RS_NACK_offset.

As show in FIG. 4B, step 312 may start with step 408, in which base station 105 determines whether a HARQ ack message transmitted by WCD 101 (e.g., the most recent HARQ ack message or the most recent HARQ ack message transmitted in response to a transport block transmitted to the WCD during a non-CSI-RS subframe) was an ACK or a NACK. If it was an ACK, then step 410 is performed, and if it was a NACK then step 412 is performed.

In step 410, base station 105 calculates CQV_offset using a NON-CSI-RS_ACK_offset_value. Specifically, base station 105 calculates: CQV_offset=CQV_offset+NON-CSI-RS_ACK_offset.

In step 412, base station 105 calculates CQV_offset using a NON-CSI-RS_NACK_offset_value, which is different than NON-CSI-RS_ACK_offset value. Specifically, base station 105 calculates: CQV_offset=CQV_offset+CSI-RS_NACK_offset. In some embodiments, NON-CSI-RS_ACK_offset is a positive value, whereas NON-CSI-RS_NACK_offset is a negative value.

In step 413, which necessarily occurs after step 410/412, base station 105 sets CQV_offset_old equal to CQV_offset.

Preferably, CSI-RS_ACK_offset is less than NON-CSI-RS_ACK_offset. Similarly, it is preferred that CSI-RS_NACK_offset is less than NON-CSI-RS_NACK_offset. In this way, the MCS that is selected when step 310 is performed will tend to be more robust than the MCS that is selected when step 312 is performed.

Figure 5A:
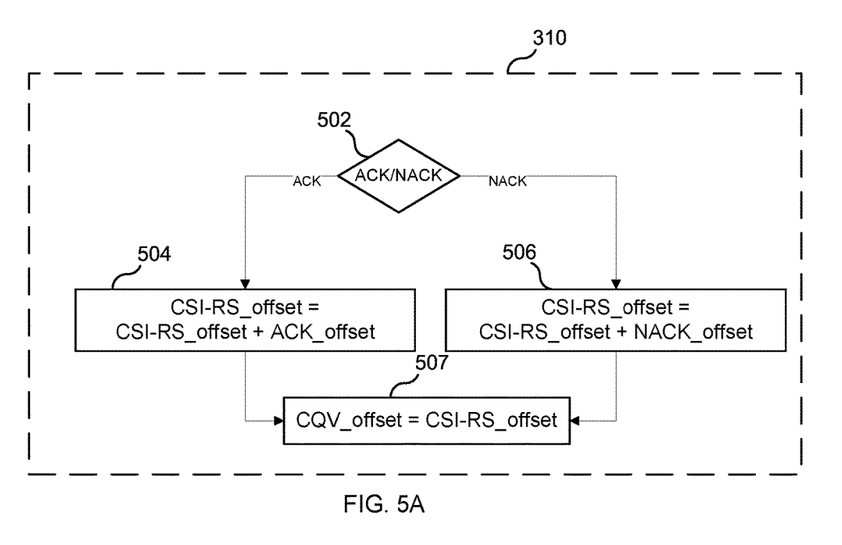
FIG. 5A is a flow chart illustrating a process according to some embodiments.
Figure 5B:
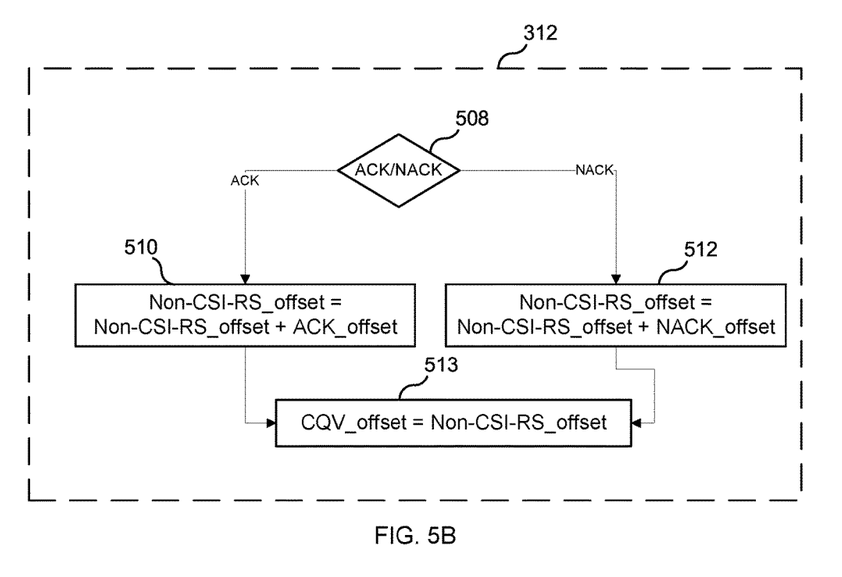
FIG. 5B is a flow chart illustrating a process according to some embodiments.

FIGS. 5A and 5B illustrate another example way in which steps 310 and 312 may be implemented, respectively.

As show in FIG. 5A, step 310 may start with step 502, in which base station 105 determines whether a HARQ acknowledgement message transmitted by WCD 101 was an ACK or a NACK. If it was an ACK, then step 504 is performed, otherwise step 506 is performed.

In step 504, base station 105 calculates: CSI-RS_offset=CSI-RS_offset+ACK_offset, where CSI-RS_offset may be an offset value associated with the WCD.

In step 506, base station 105 calculates: CSI-RS_offset=CSI-RS_offset+NACK_offset.

In step 507, base station sets CQV_offset equal to the CSI-RS_offset.

As show in FIG. 5B, step 312 may start with step 508, in which base station 105 determines whether a HARQ acknowledgement message transmitted by WCD 101 was an ACK or a NACK. If it was an ACK, then step 510 is performed, otherwise step 512 is performed.

In step 510, base station 105 calculates; NON-CSI-RS_offset=NON-CSI-RS_offset+ACK_offset, where NON-CSI-RS_offset may also be an offset value associated with the WCD.

In step 512, base station 105 calculates: NON-CSI-RS_offset=NON-CSI-RS_offset+NACK_offset.

In step 513, base station sets CQV_offset equal to the NON-CSI-RS_offset.

Preferably, CSI-RS_offset is less than NON-CSI-RS_offset. In this way, the MCS that is selected when step 310 is performed will tend to be more robust than the MCS that is selected when step 312 is performed.

Figure 6:
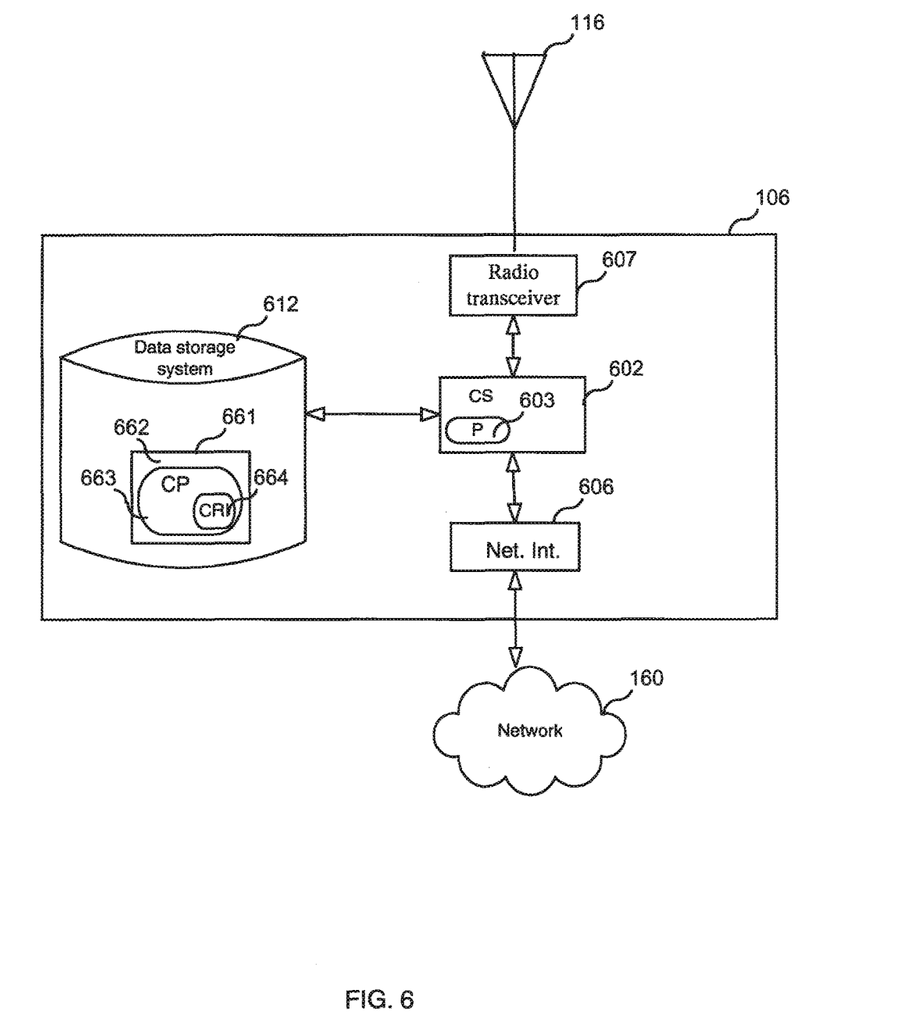
FIG. 6 is a block diagram of a base station, according to some embodiments.

FIG. 6 is a block diagram of base station 105 according to some embodiments. As shown in FIG. 6, base station apparatus 105 may include or consist of a computer system (CS) 602, which may include one or more processors 603 (e.g., a microprocessor) and/or one or more circuits, such as an application specific integrated circuit (ASIC), field-programmable gate arrays (FPGAs), a logic circuit, and the like; a network interface 606 for connecting base station 105 to a network 160; a radio transceiver 607 comprising a transmitter and a receiver for receiving and transmitting wireless signals via an antenna 116; and a data storage system 612, which may include one or more non-volatile storage devices and/or one or more volatile storage devices (e.g., random access memory (RAM)).

In embodiments where base station 105 includes a processor 603, a computer program product (CPP) 661 may be provided. CPP 661 includes or is a computer readable medium (CRM) 662 storing a computer program (CP) 663 comprising computer readable instructions (CRI) 664 for performing steps described herein (e.g., one or more of the steps shown in the flow charts). CP 663 may include an operating system (OS) and/or application programs. CRM 662 may include a non-transitory computer readable medium, such as, but not limited, to magnetic media (e.g., a hard disk), optical media (e.g., a DVD), solid state devices (e.g., random access memory (RAM), flash memory), and the like.

In some embodiments, the CRI 664 of CP 663 is configured such that when executed by computer system 602, the CRI causes the base station 105 to perform steps described above (e.g., steps described above and below with reference to the flow charts shown in the drawings). In other embodiments, the base station 105 may be configured to perform steps described herein without the need for a computer program. That is, for example, computer system 602 may consist merely of one or more ASICs. Hence, the features of the embodiments described herein may be implemented in hardware and/or software.

While various embodiments have been described above, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a base station, comprising:
   scheduling a first data transmission for a wireless communication device (WCD), said scheduled first data transmission to occur during a first transmission time interval (TTI);
   determining whether to a) select a first modulation and coding scheme (MCS) for the first data transmission using a first offset value or b) select the MCS for the data transmission using a second offset value that is different than said first offset value, wherein said determination of whether to use the first or second offset value is based on whether a certain reference signal (RS) is also scheduled to be transmitted during said first transmission time interval;
   selecting a first MCS using the first offset value as a result of determining that said certain RS is also scheduled to be transmitted during said first transmission time interval; and
   during the first transmission time interval, using the selected first MCS to transmit data to the WCD, wherein
   selecting the first MCS using the first offset value comprises determining a first channel quality value offset (CQV_offset1) using the first offset value.

2. The method of claim 1, wherein selecting the first MCS using the first offset value further comprises:
   determining a channel quality value (CQV) representing the quality of the channel between the base station and the WCD; and
   calculating an adjusted CQV (CQVa) using the determined CQV and CQV_offset1.

3. The method of claim 2, wherein CQVa=CQV+CQV_offset1.

4. The method of claim 2, wherein selecting the first MCS using the first offset value further comprises selecting the MCS based on the adjusted channel quality value CQVa.

5. The method of claim 1, wherein determining CQV_offset1 comprises: calculating CQV_offset_old+offset1, wherein CQV_offset_old is a previously determined CQV offset value and offset1 is said first offset value.

6. The method of claim 5, wherein offset1 equals one of CSI-RS_ACK_offset and CSI-RS_NACK_offset, wherein each of CSI-RS_ACK_offset and CSI-RS_NACK_offset is a predetermined offset value.

7. The method of claim 1, wherein CQV_offset1 equals CSI-RS_offset, wherein CSI-RS_offset is said first offset value.

8. The method of claim 5, further comprising:
scheduling a second data transmission for the WCD, said scheduled second data transmission to occur during a second transmission time interval;
determining whether to a) select a second modulation and coding scheme (MCS) for the second data transmission using the first offset value or b) select the MCS for the data transmission using the second offset value that is different than said first offset value, wherein said determination of whether to use the first or second offset value for the second data transmission is based on whether a certain reference signal (RS) is also scheduled to be transmitted during said second transmission time interval;
selecting a second MCS using the second offset value as a result of determining that said certain RS not scheduled to be transmitted during said second transmission time interval; and
during the second transmission time interval, using the selected second MCS to transmit data to the WCD.

9. The method of claim 8, wherein
selecting the second MCS using the second offset value comprises determining a second channel quality value offset (CQV_offset2) using the second offset value, and
determining CQV_offset2 comprises: calculating CQV_offset_old+offset2, wherein CQV_offset_old is a previously determined CQV offset value and offset2 is said second offset value.

10. The method of claim 9, wherein
offset2 equals one of NON-CSI-RS_ACK_offset and NON-CSI-RS_NACK_offset,
each of NON-CSI-RS_ACK_offset and NON-CSI-RS_NACK_offset is a predetermined offset value,
CSI-RS_ACK_offset<NON-CSI-RS_ACK_offset, and
CSI-RS_NACK_offset<NON-CSI-RS_NACK_offset.

11. A base station, comprising:
a memory
a computer system coupled to the memory and comprising a processor, wherein the computer system is configured to:
schedule a first data transmission for a wireless communication device (WCD), said scheduled first data transmission to occur during a first transmission time interval (TTI);
determine whether to a) select a first modulation and coding scheme (MCS) for the first data transmission using a first offset value or b) select the MCS for the data transmission using a second offset value that is different than said first offset value, wherein said determination of whether to use the first or second offset value is based on whether a certain reference signal (RS) is also scheduled to be transmitted during said first transmission time interval;
select a first MCS using the first offset value as a result of determining that said certain RS is also scheduled to be transmitted during said first transmission time interval; and
employ a transmitter to transmit during the first transmission time interval data to the WCD using the selected first MCS, wherein selecting the first MCS using the first offset value comprises determining a first channel quality value offset (CQV_offset1) using the first offset value.

12. The base station of claim 11, wherein selecting the first MCS using the first offset value further comprises:
determining a channel quality value (CQV) representing the quality of the channel between the base station and the WCD; and
calculating an adjusted CQV (CQVa) using the determined CQV and CQV_offset1.

13. The base station of claim 12, wherein CQVa=CQV+CQV_offset1.

14. The base station of claim 12, wherein selecting the first MCS using the first offset value further comprises selecting the MCS based on the adjusted channel quality value CQVa.

15. The base station of claim 11, wherein determining CQV_offset1 comprises: calculating CQV_offset_old+offset1, wherein CQV_offset_old is a previously determined CQV offset value and offset1 is said first offset value.

16. The base station of claim 15, wherein offset1 equals one of CSI-RS_ACK_offset and CSI-RS_NACK_offset, wherein each of CSI-RS_ACK_offset and CSI-RS_NACK_offset is a predetermined offset value.

17. The base station of claim 11, wherein CQV_offset1 equals CSI-RS_offset, wherein CSI-RS_offset is said first offset value.

18. The base station of claim 15, wherein the computer system is further operable to:
schedule a second data transmission for the WCD, said scheduled second data transmission to occur during a second transmission time interval;
determine whether to a) select a second modulation and coding scheme (MCS) for the second data transmission using the first offset value or b) select the MCS for the data transmission using the second offset value that is different than said first offset value, wherein said determination of whether to use the first or second offset value for the second data transmission is based on whether a certain reference signal (RS) is also scheduled to be transmitted during said second transmission time interval;
select a second MCS using the second offset value as a result of determining that said certain RS not scheduled to be transmitted during said second transmission time interval;
employ a transmitter to use the selected second MCS to transmit data to the WCD during the second transmission time interval.

19. The base station of claim 18, wherein
selecting the second MCS using the second offset value comprises determining a second channel quality value offset (CQV_offset2) using the second offset value, and
determining CQV_offset2 comprises: calculating CQV_offset_old+offset2, wherein CQV_offset_old is a previously determined CQV offset value and offset2 is said second offset value.

20. The base station of claim 19, wherein
offset2 equals one of NON-CSI-RS_ACK_offset and NON-CSI-RS_NACK_offset,
each of NON-CSI-RS_ACK_offset and NON-CSI-RS_NACK_offset is a predetermined offset value,
CSI-RS_ACK_offset<NON-CSI-RS_ACK_offset, and
CSI-RS_NACK_offset<NON-CSI-RS_NACK_offset.

* * * * *

UNITED STATES PATENT AND TRADEMARK OFFICE
CERTIFICATE OF CORRECTION

PATENT NO. : 9,877,336 B2
APPLICATION NO. : 14/654615
DATED : January 23, 2018
INVENTOR(S) : Åhlander et al.

Page 1 of 1

It is certified that error appears in the above-identified patent and that said Letters Patent is hereby corrected as shown below:

On the Title Page

In Item (56), under "OTHER PUBLICATIONS", in Column 2, Line 4, delete "Jecksonville,USA," and insert -- Jacksonville, USA, --, therefor.

In the Drawings

In Fig. 6, Sheet 6 of 6, delete Tag "106" and insert Tag -- 105 --, therefor.

In the Specification

In Column 3, Line 65, delete "value," and insert -- value. --, therefor.

In Column 6, Line 2, delete "WCD 100" and insert -- WCD 110 --, therefor.

In Column 6, Line 28, delete "WCD 101" and insert -- WCD 110 --, therefor.

In Column 6, Line 51, delete "WCD 101" and insert -- WCD 110 --, therefor.

In Column 7, Line 13, delete "WCD 101" and insert -- WCD 110 --, therefor.

In Column 7, Line 29, delete "calculates;" and insert -- calculates: --, therefor.

In Column 7, Line 43, delete "consist of" and insert -- consist of: --, therefor.

In the Claims

In Column 9, Line 44, in Claim 11, delete "memory" and insert -- memory; --, therefor.

Signed and Sealed this
Tenth Day of April, 2018

Andrei Iancu
*Director of the United States Patent and Trademark Office*